W. T. COOLEY.
Earth Augers.

No. 143,276.        Patented September 30, 1873.

WITNESSES.
A. C. Gridley
F. F. Warner

INVENTOR.
William T. Cooley

UNITED STATES PATENT OFFICE.

WILLIAM T. COOLEY, OF CHICAGO, ILLINOIS, ASSIGNOR OF ONE-HALF HIS RIGHT TO DARIUS H. WELLS, OF SAME PLACE.

IMPROVEMENT IN EARTH-AUGERS.

Specification forming part of Letters Patent No. 143,276, dated September 30, 1873; application filed March 3, 1873.

*To all whom it may concern:*

Be it known that I, WILLIAM T. COOLEY, of Chicago, in the county of Cook and State of Illinois, have invented a new, useful, and Improved Earth-Auger, of which the following is a full, clear, and exact description, which will enable others skilled in the art to which my invention appertains to make and use the same, reference being had to the accompanying drawing forming a part of this specification, and in which—

Figure 1:
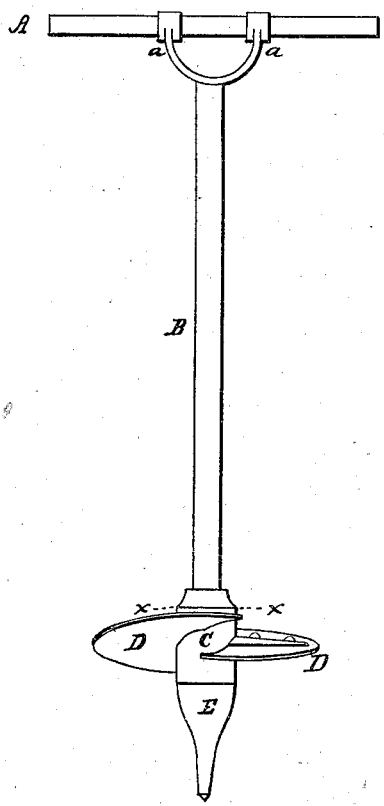
Figure 2:
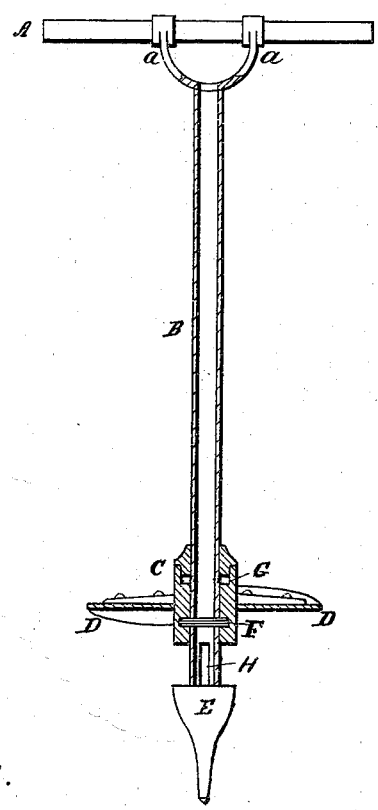
Figure 3:
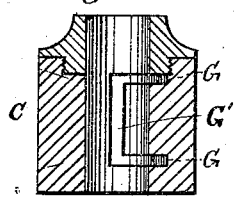

Figure 1 represents a side elevation of my improved auger; Fig. 2 a vertical central section of the same; Fig. 3, a like view of the head-block detached; and Fig. 4, a horizontal section in the plane of the line $x\ x$.

Like letters of reference indicate like parts.

Heretofore the vent of this class of augers has been liable to become clogged with earth. My object is to overcome this objectionable feature; and my invention consists in certain novel features relating to the means employed for this purpose, and hereinafter fully described and set forth.

In the drawing, A represents the handle of the auger, and B is a tubular shank attached to the handle. The top of the shank B is open, and it is attached to the handle by means of the arms $a\ a$. By this means earth or other substances which accidentally enter the shank may be more readily removed than if the shank were attached directly to the handle and provided with a lateral opening. C is an adjustable block, arranged on the shank B, which is capable of being turned freely in the block C. D D are boring-lips or cutters, attached to the block C. E is a point, attached to the lower end of the shank B.

It will be observed that the upper end of the point E is considerably larger in diameter than the shank B, and I deem it preferable to make it of the same diameter as the lower end of the block C.

F is a pin projecting from the shank B. G G are horizontal grooves cut in the block C, and G' G' are vertical grooves therein, connecting the grooves G G. The pin F is arranged to extend into the grooves G and G'.

For the purpose of arranging the pin F in the grooves G and G' with facility, and covering said grooves, I deem it preferable to make the block C in two parts, united to each other by a screw attachment, as shown in Figs. 2 and 3. H is a slot or vent in the shank B.

Figure 4:
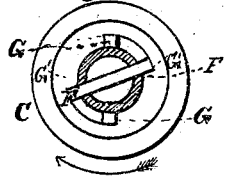

During the operation of boring, the pin F is arranged in the upper grooves G G, and the handle is turned until the pin F reaches the closed end of the said grooves, as shown in Fig. 4. The continued movement of the handle in the same direction will carry the whole auger around in the direction indicated by the arrow, and the cutters will be forced into the earth.

It will also be perceived that the vent H will be wholly covered by the block C during the operation of boring.

In order to draw the auger, the movement of the handle is reversed until the pin F reaches the grooves G' G'. The contact of the cutters with the earth will prevent a downward movement of the block C, but the point E renders the shank B capable of being pushed down when a downward pressure is exerted upon the handle for that purpose. As the handle is pushed down the point E leaves the block C and crowds the earth away from the shank at the same time the vent H is uncovered. The movement of the handle is again reversed until the pin F enters the lower slots G G, and the auger may then be readily withdrawn from the hole.

It may be here noted that only one end of the pin F need project into the block C.

The grooves G and G' may also be curved at their intersection, so that the pin will pass more readily from one into the other.

Other immaterial changes in the construction of the various parts of the auger may also be made.

Having thus described my invention, what I claim as new, and desire to secure by Letters Patent, is—

1. The hollow shank B, provided with the vent H, point E, and pin F, in combination with the loose grooved block C, substantially as and for the purposes specified.

2. In an earth-auger, a hollow shank, provided with a vent, arranged below the cutters, and having its upper end open, and attached to the handle by means of the arms $a\ a$, substantially as specified.

WILLIAM T. COOLEY.

Witnesses:
N. C. GRIDLEY,
F. F. WARNER.